Feb. 17, 1953 G. J. LANGMYHR 2,628,894
COUNTERCURRENT EXTRACTION METHOD AND APPARATUS
Filed Feb. 28, 1951 2 SHEETS—SHEET 1

George J. Langmyhr INVENTOR.

George J. Langmyhr INVENTOR

Patented Feb. 17, 1953

2,628,894

UNITED STATES PATENT OFFICE 2,628,894

COUNTERCURRENT EXTRACTION METHOD AND APPARATUS

George J. Langmyhr, Sarnia, Ontario, Canada

Application February 28, 1951, Serial No. 213,200

9 Claims. (Cl. 23—310)

This invention is directed to improvement of treating towers. More specifically the invention relates to a tower to be used in the process for the purification of lubricating oils by extraction of undesirable components with phenol, but is not limited thereto.

In the manufacture of lubricating oils, contacting the raw lubricating oil fractions of crude petroleum with phenol has been practiced for many years, using various types of equipment for the mixing and subsequent separation. The counter-current treating tower which has been widely used, consists of a series of cells made from horizontal plates containing orifices through which phenol and oil pass counter-currently. The cells or contacting sections in the existing treating towers are fixed and present limitations in the treating of a wide range of distillates. Insufficient mixing in some sections of the tower, excessive mixing in other sections, are conditions which are quite frequently experienced, and prevent approach to the ideal condition of mixing and settling in each cell. The existing towers have a further disadvantage in that certain amount of the phases pass each other without coming into intimate contact contributing further to poor mixing.

It is one of the objects of this invention to substantially improve the period of contact in a given height of a treating tower by use of a helix shaped structure in place of the conventional horizontal plates with orifices.

Another object of the invention resides in providing means of varying the degree of mixing, said means to be operated manually or automatically to suit each grade of distillate.

At the same time the design gives a centrifuging action in a treating tower whereby both solvent and feed would be expected to give a centrifuging action which would aid in phase separation after mixing.

In its particular aspect, my invention provides an improved treating tower for treating lubricating oil with phenol to remove undesirable constituents from the oil. In the normal manner of operation the tower is filled with phenol, so that phenol is the continuous phase. Fresh phenol is admitted to the upper part of the treating tower and the oil near the bottom of the tower. The treated product or raffinate leaves the treating tower from the top after passing through a final settling section. The spent phenol containing the extracted materials from the lube oil distillate leaves the tower at the bottom after passing through a final settling section. The phenol moves countercurrently to the oil along the helix, while the oil can travel either along the helix or through perforated holes in the helix. Thence, the mixing zones comprises a plurality of perforated flights with adjustable baffles, radially mounted therebetween. A plurality of non-perforated flights, interposed at intervals between the aforesaid perforated flights constitutes the settling zones in the structures. The two types of flights are so mounted as to form a helicoid with a continuous helix-shaped passage with ditinct settling zones after each mixing zone. Each turn of the helicoid acts as a horizontal baffle to give phase separation, while flow through the holes gives mixing after each separation. The ratio of flow through perforations in the flights to flow along the helix would be determined by the relation between the pitch of the helicoid and the number and the diameter of the holes, and by the positioning of the adjustable baffles. For a given feed rate the degree of mixing and separation can be varied which is one of the novel features of my invention as compared to the standard pierced plate type tower, step-tray tower and packed tower. Furthermore, the rotating motion along the helicoid of both solvent and feed will give a centrifuging action which would aid in phase separation after mixing.

Other objects of the invention will appear hereinafter, the novel features and combinations being set forth in the appended claims. In the accompanying drawings:

Figure 1:
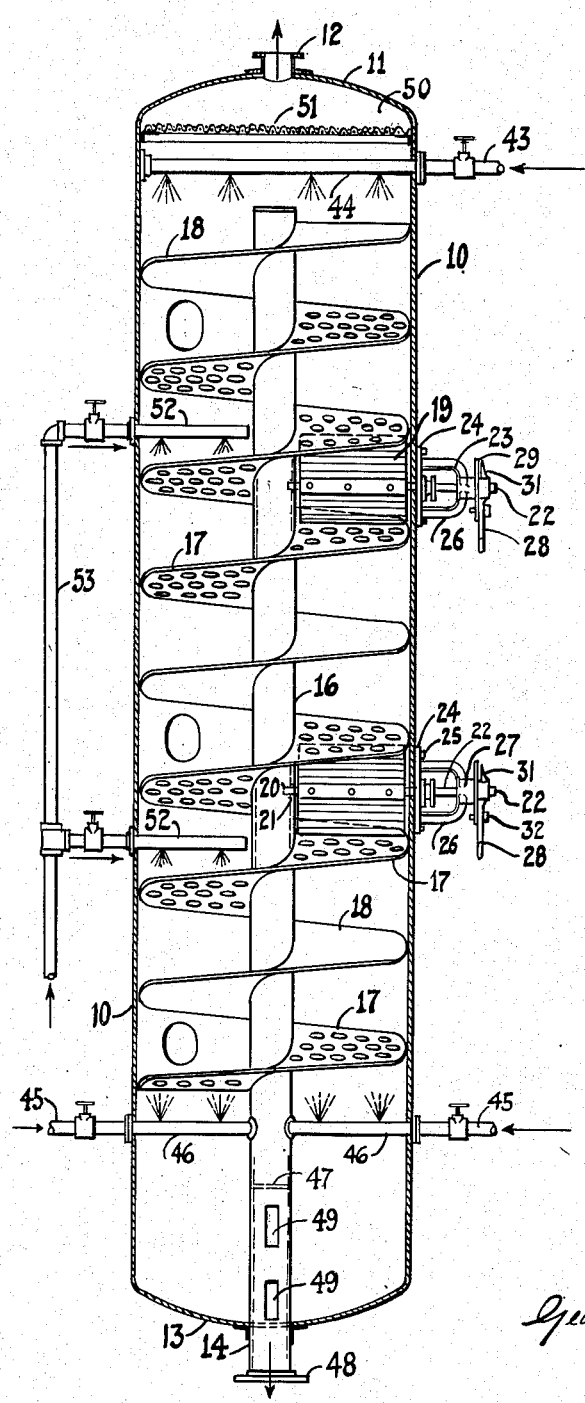
Figure 1 is a sectional elevation showing the general arrangement of the structure with adjustable baffles manually operated.

Referring now to the drawings, reference character 10 designates the shell of a treating tower provided with a cover 11 to which is secured a treated oil outlet nozzle 12 and provided with a bottom 13 to which is attached extract discharge nozzle 14. A helicoid is positioned within the tower and supported by a centrally disposed, tubular member 16, the inner and outer edges of the helicoid are maintained in fluid-tight relation to the tubular member and to the shell respectively by means of welding, iron cement or the like. The helicoid comprising a plurality of perforated flights 17 constitute the mixing zones in the tower and a plurality of non-perforated flights 18 interposed at intervals between the perforated flights, from the settling zones in the structure.

Figure 3:
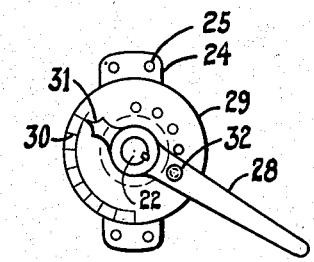
Figure 3 is an enlarged end view showing the operating and locking mechanism for manually operated, adjustable baffles.

It is known that adjustable means in a treating tower are very desirable in order to control the counter current flow of phenol and oil during the process. The ratio of flow through the holes in the perforated flights 17 would be determined by the positioning of vertical adjustable baffles 19. Thus, for a given feed rate the degree of mixing and separation can be varied. I prefer to carry out the feature of the invention in the manner shown in Figures 1, 2 and 3, where it will be seen that a baffle plate 19 has been introduced between the perforated flights 17 and pivotally mounted between the shell 10 and the tubular member 16. A pivot 20 is secured to the inner end of the baffle plate and rotatively mounted in a bore 21 in the tubular member. The baffle plate carries an outwardly extending shaft 22 rotatively mounted in a yoke portion as shown. The baffle operating mechanism, comprising a yoke portion 23 and a flange portion 24, is secured to the shell 10 of the tower by means of bolts 25. The yoke portion as shown is formed of two or more webbed arms 26 of which two are opposed. The arms terminate in a collar portion 27 bored to receive shaft 22, a lever handle 28 secured to the shaft is provided for the adjustment of the baffle. It is imperative that the precise angular position of the baffle plate should be transmitted to the operator. A disc 29 is therefore secured to the collar 27 and provided with a graduated scale 30 as shown in Figure 3. The indicator pointer 31 is formed integral with the lever handle 28 and the baffle plate may be locked in any angular position desired by means of a locking pin 32 extending through suitable bores in the lever handle and the disc 29.

Figure 4:
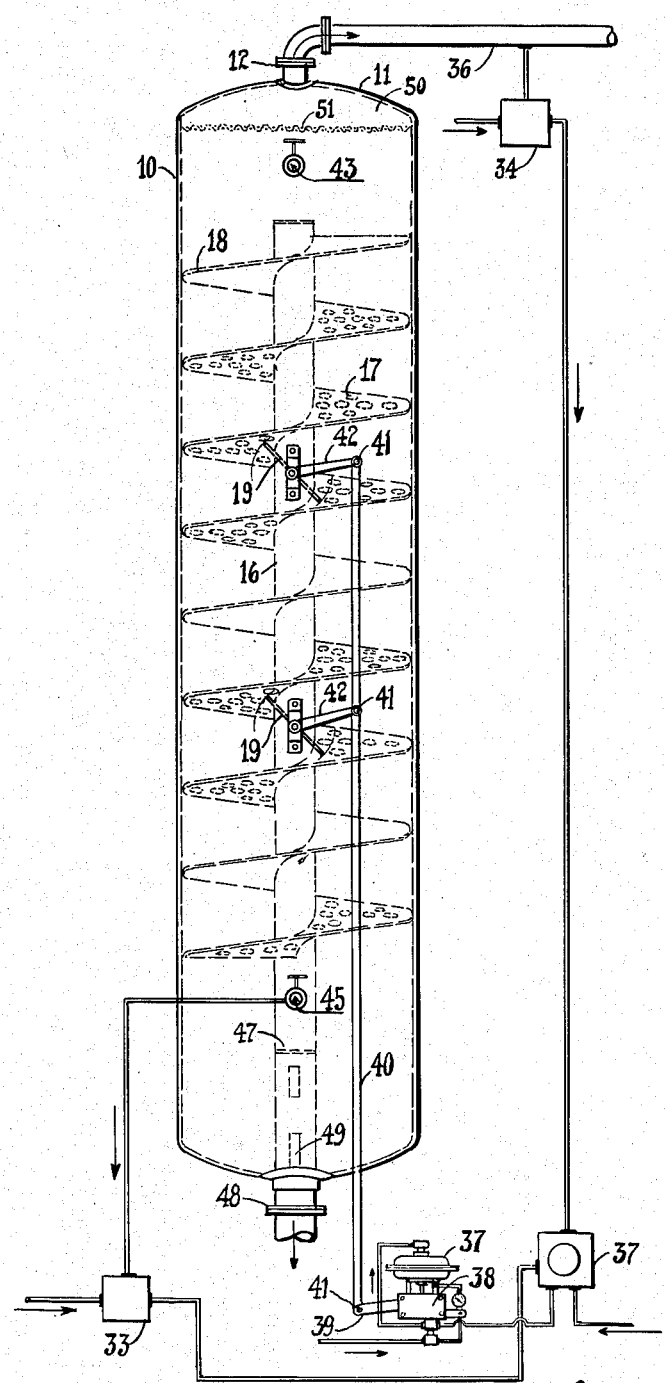
Figure 4 is an elevational view of the structure showing the arrangement of instruments for automatic control of the baffles.

Referring in detail to Fig. 4, specific gravity transmitters 33 and 34 are connected to the untreated oil line 35 and to the treated oil line 36 respectively. The desired difference in specific gravity between the untreated and the treated oil is maintained through the action of a specific gravity differential controller 37 connected to the aforesaid specific gravity transmitters as shown in Fig. 4.

The differential gravity controller actuates a springless pneumatic motor 38 (similar to Conomotor, Type B-12). The movement of the diaphragm in the instrument is transmitted to an outwardly extending lever arm 39 which is pivoted for vertical pivoted movement, this movement is transmitted to a pull and push rod 40 secured to the lever arms by means of bolts 41 extending through suitable bores in the lever 42 and the pull and push rod, which in turn adjust the baffles 19 to angular position desired. In this manner the differential gravity controller 37 automatically effects desired changes in the degree of contact of oil and phenol by actuating the adjustable baffles.

The movement of the manual and automatically operated baffles as above described, controls the degree of contact in a tower operating with phenol as continuous phase, however, the tower will function with an equal degree of efficiency with oil as the continuous phase. In this case, the phenol, on account of its relative density will form the undercurrent of the stream and the baffles serve to vary the hydrostatic head of the downwardly moving stream of phenol and accelerate it through the perforations in the flights of the helicoid into the upward flowing oil, or vice versa. By this means it will be possible to vary the degree of contact and subsequent properties of a wide range of oils of varying viscosities.

Figure 2:
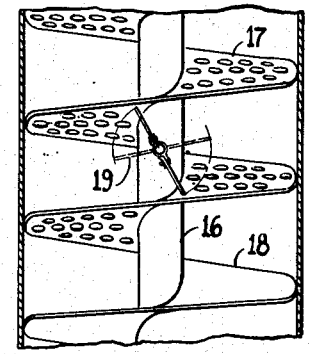
Figure 2 is a part-sectional elevational of the tower showing an end view of the baffle.

Phenol is admitted into the upper part of the tower through pipe 43 and a header 44 perforated to attain an even distribution of phenol in the tower. The oil is introduced into the lower part of the tower by way of pipes 45 and header 46 as shown in Figure 1.

The lower part of the tubular member 16 is formed into a discharge chamber by means of a partition plate 47 which is secured in a fluid-tight relation to the inner wall of the tubular member, which extends through the bottom 13 and terminates in a flanged portion 48. The spent phenol containing the extracted material from the lube oil distillate leaves the tower through the ports 49 provided for in tubular member 16. The treated product or raffinate leaves the tower from the top after passing through a final settling section 50 and a wire screen 51 secured to the wall of the tower. The phenol will coalesce on the wire screen and the phenol droplets will again be returned into the lower part of the tower, thus reducing the quantity of phenol carried out with the raffinate. In order to control the miscibility of phenol and oil, phenolic water may be injected into the various sections of the lower by way of a plurality of pipes 52 connected to header 53.

Through the improved design of the tower and the above described instrumentation, means are provided for continuously detecting deviation from desired treating standards, and for immediately inaugurating corrective action in order to secure the highest treating standards.

While I have shown and described my invention as being particularly applicable to the treatment of oil with phenol it should be clear that I am not limited to this type of contacting—as the tower is equally applicable to a wide field in solvent extraction, or other liquid-liquid contacting process.

I claim:

1. A fluid contacting tower comprising a closed cylindrical container mounted with the axis thereof vertical, a helicoid mounted therein coaxial therewith having the outer peripheral edges of the flights thereof joined to the cylindrical walls of said container in fluid-tight manner and the inner edges joined to a central vertical shaft, at least one valve means mounted between flights to control the rate of passage of fluid flowing helically therealong, means for introducing a contact fluid into the bottom of said tower and means for withdrawing said fluid from the top of said tower, and means in the top of said tower independent of said withdrawal means for introducing another contact fluid, and means in the bottom of said tower, independent of said first fluid introducing means, for withdrawing the second fluid after contact.

2. A fluid contacting tower comprising a closed cylindrical container mounted with the axis thereof vertical, a helicoid mounted therein coaxial therewith having the outer peripheral edges of the flights thereof joined to the cylindrical walls of said container in fluid-tight manner and the inner edges joined to a central vertical shaft, at least a short portion of said flights being perforated to allow fluid to pass vertically through said perforations from flight to flight, at least one valve means mounted between flights to control the rate of passage of fluid flowing helically therealong, means for introducing a first fluid to be contacted into the bottom of said tower and means for withdrawing said fluid after contact from the top of said tower, and means in the top of said tower, independent of said fluid withdrawal means for introducing a second fluid to be contacted and means in the bottom of said tower, independent of said first fluid introducing means, for withdrawing the second fluid after contact.

3. A fluid contacting tower comprising a closed cylindrical container mounted with the axis thereof vertical, a helicoid mounted therein coaxial therewith having the outer peripheral edges of the flights thereof contacting the cylindrical walls in fluid-tight manner and the inner edges joined to a central vertical shaft, said flights being perforated in a plurality of vertically disposed zones alternating with zones comprising imperforate flight portions, whereby at least a portion of the fluid in said perforate zones may pass vertically through said perforations and fluid in said imperforate zones is constrained to flow helically from flight to flight, at least one valve means mounted between flights to proportionate the fluid flow between the vertical and helical directions, means for introducing a first fluid to be contacted into the bottom of said tower and means for withdrawing said fluid after contact from the top of said tower, and means in the top of said tower independent of said fluid withdrawal means for introducing a second contact fluid to be contacted and means in the bottom of said tower, independent of said first fluid introducing means, for withdrawing the second fluid after contact.

4. Apparatus as defined in claim 3 wherein said means for proportionating the vertical and helical flow comprises a butterfly-type valve having its vane mounted in the helical passage between two vertically disposed flights and having manual control means therefor extending outside of said cylindrical tower.

5. Apparatus as defined in claim 3 wherein said means for proportionating the vertical and helical flow comprises a plurality of valves each mounted in each of said mixing zones in the helical passage between two vertically disposed perforated flights comprising a mixing zone, each valve having manual control means for setting and fixing the position thereof extending outside of said cylindrical tower.

6. Apparatus as defined in claim 3 wherein said means for proportionating the vertical and helical flow comprises at least one valve mounted between perforated flights in at least one mixing zone, automatically controlled to proportionate vertical and helical flow of fluid therein by the specific gravity differential between contacted and uncontacted fluid pasing to and from said apparatus.

7. A fluid contacting tower comprising a closed cylindrical container mounted with the axis thereof vertical, a helicoid mounted therein co- axial therewith having the outer peripheral edges of the flights thereof contacting the cylindrical walls in fluid-tight manner and the inner edges joined to a central vertical shaft, said flights being perforated in a plurality of vertically disposed zones alternating with zones comprising imperforate flight portions, said perforated flight portions comprising mixing zones and said alternate imperforate flight portions comprising settling zones, the flights of said helicoid terminating a short distance below the upper and above lower portions of said container, to define additional fluid separating zones, means for introducing fluid to be treated into the bottom of said container comprising the lower separating zone, means for withdrawing said fluid after treatment from the top of said container comprising the upper separating zone, means for introducing fluid treating agent to the top of said helicoid and beneath said upper separating zone, and additional means for introducing fluid treating agent to each of said perforated flight portions comprising said alternate mixing zones, means for withdrawing spent treating agent at different vertical levels in said lower separating zone, and means for proportionating the flow of fluid in a perforated flight portion between the vertical passage of fluid through said perforations and the helical passage of fluid around the flights of said helicoid.

8. A fluid contacting tower for extraction of lubricating oil with phenol as defined in claim 7, means to separate the phenol and the treated oil at a point near the top of the tower, said means comprising an annular screen placed horizontally in said tower within said upper separating zone.

9. The method of countercurrently extracting undesirable components from a fluid, comprising passing the fluid to be treated in a helical path vertically along an inclined plane against a similar but countercurrent passage of fluid extraction medium having a specific gravity different from the fluid to be treated, whereby the fluids tend to contact each other and to separate by gravity in relative countercurrent movement, and proportionating a portion of the fluids passing helically to pass directly vertically for intensive mixing thereof at at least one point intermediate the path of helical travel of the fluids in contact and separating treated fluid raffinate by gravity from fluid extract and extracting medium after vertical passage at opposite ends of the helical passage

GEORGE J. LANGMYHR.

REFERENCES CITED

The following references are of record in the file of this patent:

UNITED STATES PATENTS

| Number | Name | Date |
|---|---|---|
| 192,069 | Higbie | June 19, 1877 |
| 2,559,129 | Miller | July 3, 1951 |

FOREIGN PATENTS

| Number | Country | Date |
|---|---|---|
| 329,723 | Great Britain | May 29, 1930 |